(12) United States Patent
Zimmerman et al.

(10) Patent No.: US 8,646,827 B2
(45) Date of Patent: Feb. 11, 2014

(54) VEHICLE INTERIOR ASSEMBLY

(75) Inventors: Michael Zimmerman, Wixom, MI (US); Shigeru Ueda, Gyoda (JP); Douglas Dawe, Milford, MI (US)

(73) Assignee: Nissan North America, Inc., Franklin, TN (US)

(*) Notice: Subject to any disclaimer, the term of this patent is extended or adjusted under 35 U.S.C. 154(b) by 0 days.

(21) Appl. No.: 13/451,716

(22) Filed: Apr. 20, 2012

(65) Prior Publication Data

US 2013/0278001 A1     Oct. 24, 2013

(51) Int. Cl.
*B62D 25/14*      (2006.01)
*B60K 37/00*      (2006.01)

(52) U.S. Cl.
USPC .................................. 296/72; 296/70; 180/90

(58) Field of Classification Search
USPC ........................................... 296/97.7; 180/90
See application file for complete search history.

(56) References Cited

U.S. PATENT DOCUMENTS

| | | |
|---|---|---|
| 7,401,835 B2 | 7/2008 | Gresham et al. |
| 7,798,518 B2 | 9/2010 | Kornylo et al. |
| 8,011,690 B2 | 9/2011 | Zucal et al. |
| 8,011,709 B2 | 9/2011 | Senakiewich, II et al. |
| 8,104,813 B2 | 1/2012 | She |
| 2009/0266635 A1* | 10/2009 | Sato ................................ 180/90 |

OTHER PUBLICATIONS

U.S. Appl. No. 13/015,112, filed Jan. 27, 2011, Spitler.

* cited by examiner

*Primary Examiner* — Glenn Dayoan
*Assistant Examiner* — Melissa A Black
(74) *Attorney, Agent, or Firm* — Global IP Counselors, LLP (57) ABSTRACT

A vehicle interior assembly includes a vehicle interior part and a trim panel. The vehicle interior part includes at least two mounting sections defining at least two mounting openings extending therethrough. The trim panel includes at least two projections extending through the at least two mounting openings of the vehicle interior part from a backside surface of the trim panel, respectively, one of the projections having an attachment portion that retains the trim panel on the vehicle interior part in an installed position. One of the projections includes a restricting portion spaced from the mounting section of the vehicle interior part by a first prescribed deployment distance with the trim panel in the installed position. The restricting portion is configured to contact a corresponding one of the mounting sections of the vehicle interior part and retain the trim panel from being completely detached from the vehicle interior part.

20 Claims, 11 Drawing Sheets

VEHICLE INTERIOR ASSEMBLY

BACKGROUND

1. Field of the Invention

The present invention generally relates to a vehicle interior assembly that includes a trim panel attached thereto. More specifically, the present invention relates to a trim panel that includes several stages of attachment that prevent complete detachment of the trim panel in response to deployment of an airbag.

2. Background Information

The inclusion of one or more airbags in passenger vehicles has been a safety requirement in vehicles for many years. In order to conceal the airbags, manufacturers have covered airbags with trim elements and trim panels that are at least partially detached upon deployment of the airbag.

SUMMARY

One object of the invention is to prevent a trim panel that does not conceal an airbag from becoming detached from an interior assembly upon deployment of an airbag.

In view of the state of the known technology, one aspect has a vehicle interior assembly that includes a vehicle interior part and a trim panel. The vehicle interior part includes at least two mounting sections defining at least two mounting openings extending therethrough. The trim panel includes at least two projections extending through the at least two mounting openings of the vehicle interior part from a backside surface of the trim panel, respectively. One of the projections has an attachment portion that retains the trim panel on the vehicle interior part in an installed position. One of the projections includes a restricting portion spaced from the mounting section of the vehicle interior part by a first prescribed deployment distance with the trim panel in the installed position. The restricting portion is configured to contact a corresponding one of the mounting sections of the vehicle interior part and retain the trim panel from being completely detached from the vehicle interior part.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
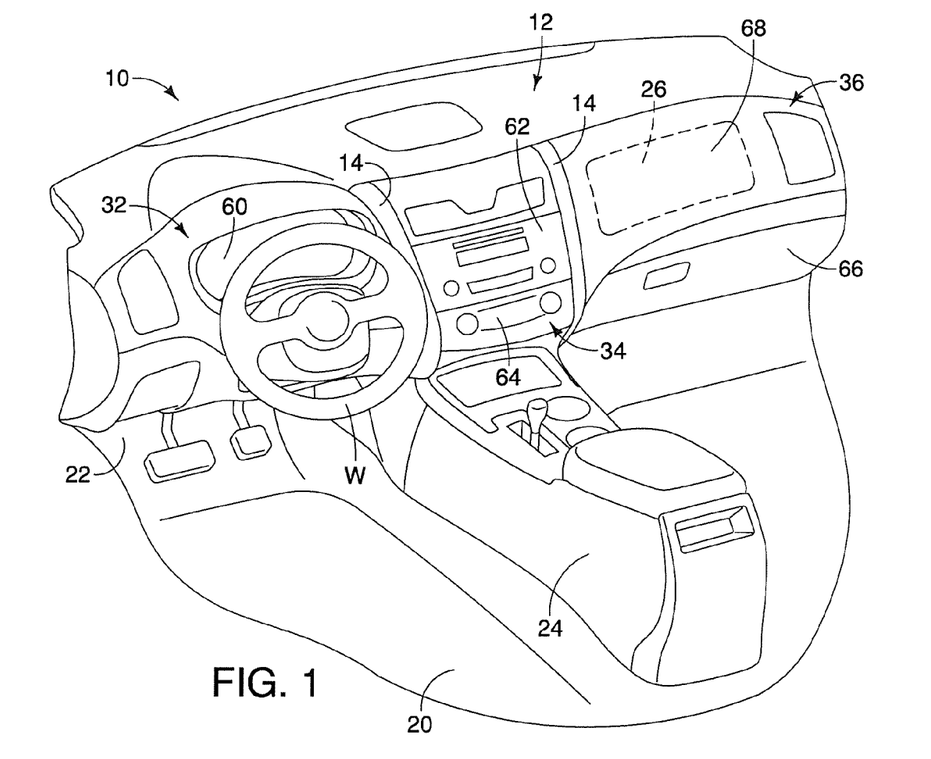
FIG. 1 is a perspective view of a portion of a passenger compartment of a vehicle showing a center console, an instrument panel and trim panels attached to the instrument panel in accordance with one embodiment.
Figure 2:
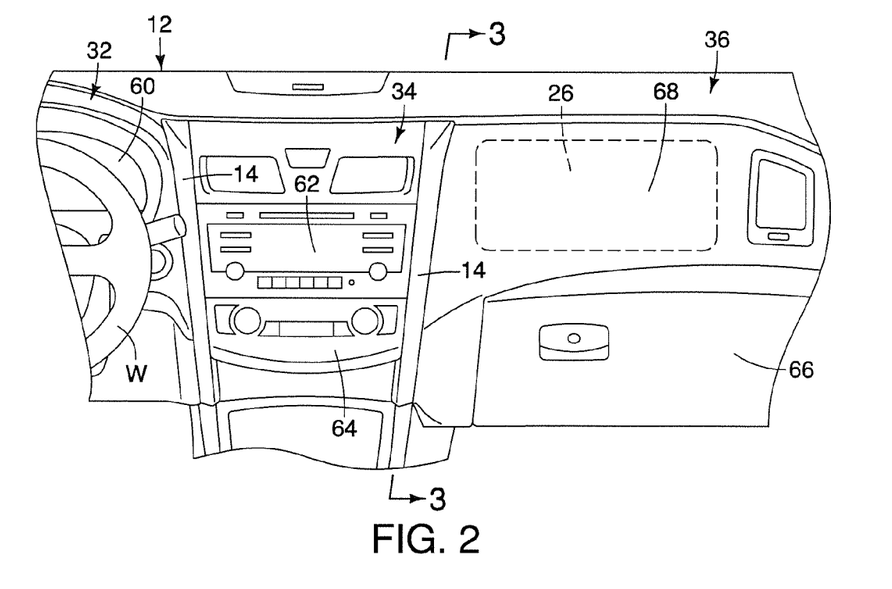
FIG. 2 is a plan view of the instrument panel of the passenger compartment shown in FIG. 1, showing the trim panels and an indication of an airbag hidden behind the instrument panel in accordance with the one embodiment.

Referring initially to FIGS. 1 and 2, a passenger compartment 10 of a vehicle, the passenger compartment including an instrument panel 12 and a trim panel 14, is illustrated in accordance with a first embodiment.

The passenger compartment 10 is defined within a vehicle body structure that includes, among other things, a floor 20 and a front wall 22. The instrument panel 12 is fixedly attached to the front wall 22 of the vehicle 10 (e.g., via a cross-car beam—not shown) in a conventional manner. A center console 24 is attached to the floor 20 in a conventional manner and extends rearward from a central region of the instrument panel 12. An airbag 26 is also fixedly coupled to the front wall 22 by structural elements (e.g., via the cross-car beam—not shown) in a conventional manner. The structural elements (not shown) can be directly fixed to the front wall 22 or to the cross-car beam (not shown) and hidden from view by the instrument panel 12. It should be understood from the drawings and the description herein that there can be multiple airbags within the passenger compartment 10 of the vehicle. However, the airbag 26 has at least a peripheral relationship to the features of the trim panel 14. Therefore, only the airbag 26 is identified within the passenger compartment 10 for purposes of understanding the various features of the invention.

The instrument panel 12 is an interior assembly of the passenger compartment 10. The instrument panel 12 basically includes at least one frame portion 30 (shown in FIG. 3), a driver's side section 32, a central section 34, a passenger's side section 36, and two of the trim panels 14. The instrument panel 12 further includes various conventional panels and conventional components provided throughout the driver's side section 32, the central section 34 and the passenger's side section 36 that are not identified or described for the sake of brevity.

The frame portion 30 is an interior part (shown in FIG. 3) that is mounted and/or supported within the passenger compartment 10 in a conventional manner. For example, the frame portion 30 can be fixed to the front wall 22 or the cross-car beam by fasteners (not shown). The frame portion 30 can include a metal frame, a composite frame and/or molded plastic or polymer elements as needed and desired. In other words, the frame portion 30 can have any of a variety of shapes and forms, depending upon the overall design of the passenger compartment 10 and instrument panel 12, and is not limited to the schematic representation shown in FIGS. 3 and 4.

Figure 3:
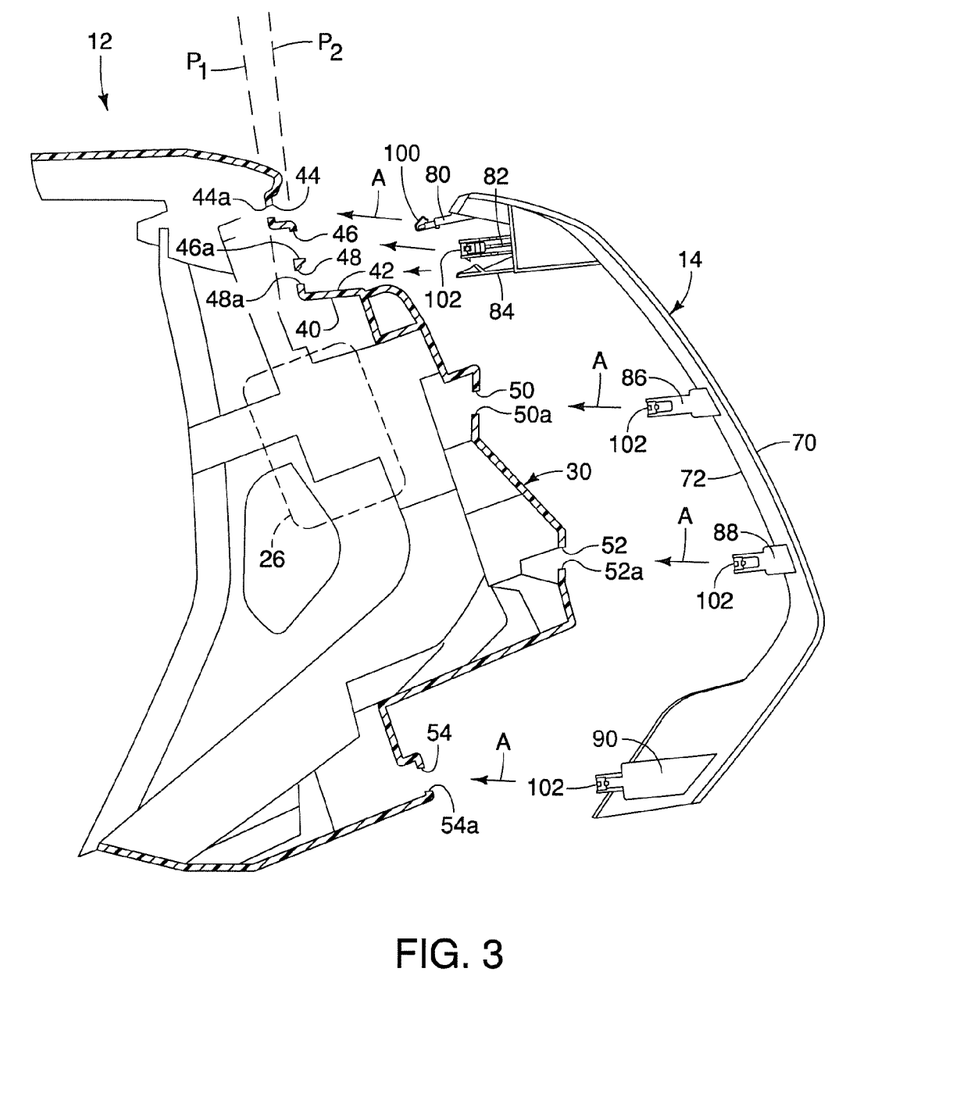
FIG. 3 is an exploded side view of a frame portion of the instrument panel showing one of the trim panels in position prior to installation to the frame portion in accordance with the one embodiment.
Figure 4:
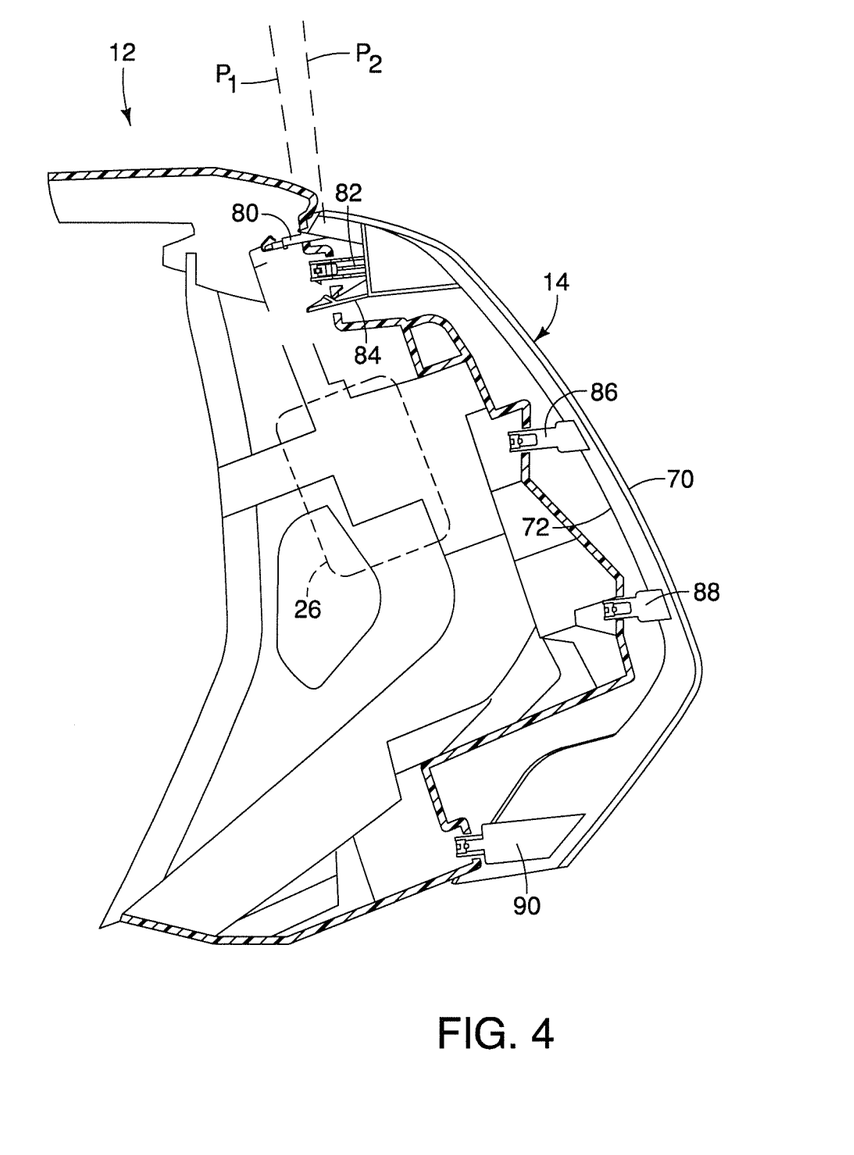
FIG. 4 is another side view of the frame portion of the instrument panel showing the trim panel installed to the frame portion in accordance with the one embodiment.
Figure 5:
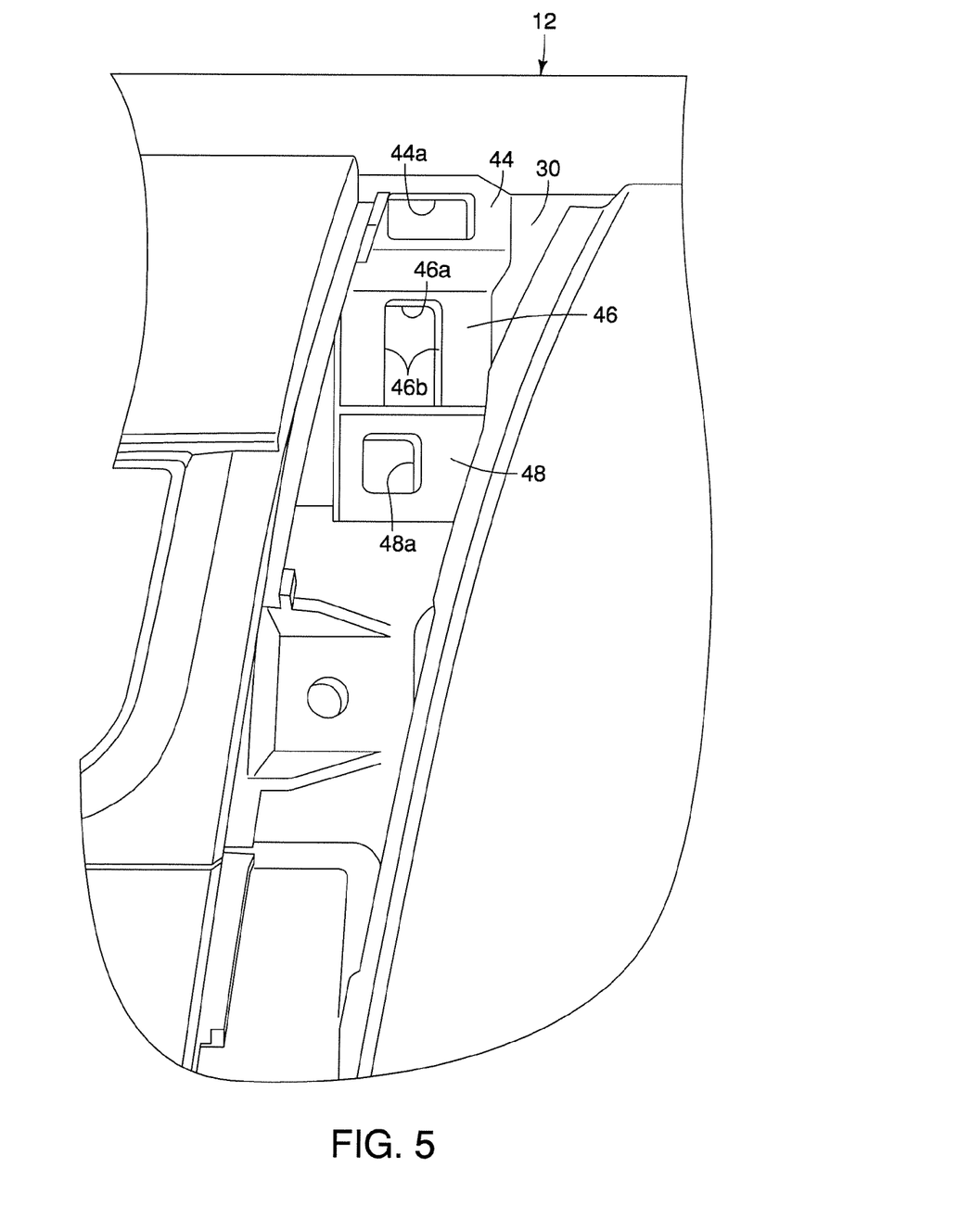
FIG. 5 is a plan view of a portion of the instrument panel with the trim panel removed showing a mounting section of the frame portion in accordance with the one embodiment.

The frame portion 30 includes an outer shell with an inner surface 40, an outer surface 42 and a plurality of mounting sections, such as a first mounting section 44, a second mounting section 46, a third mounting section 48 and lower mounting sections 50, 52 and 54. Each of the mounting sections 44, 46, 48, 50, 52 and 54 defines a corresponding mounting opening or mounting hole that extends from the inner surface 40 to the outer surface 42. More specifically, as best shown in FIGS. 3-5, the first mounting section 44 defines a mounting hole 44a, the second mounting section 46 defines a mounting hole 46a and the third mounting section 48 defines a mounting hole 48a. As shown in FIGS. 3 and 4, each of the lower mounting sections 50, 52 and 54 define respective mounting holes 50a, 52a and 54a.

The frame portion 30 includes various other conventional mounting portions (not shown) for supporting the various elements and components of the instrument panel 12, description of which is omitted for the sake of brevity. Further, sections of the outer surface 42 of the frame portion 30 can also include a decorative outer covering made of textile, leather, wood veneer, and/or other materials depending upon design of the passenger compartment 10.

As shown in FIG. 3, the first mounting section 44 extends along a plane $P_1$, while the second and third mounting sections 46 and 48 extend along a plane $P_2$. The plane $P_1$ and plane $P_2$ are spaced apart from one another in the vicinity of the first, second and third mounting sections 44, 46 and 48. As well, the mounting hole 44a defined by the first mounting section 44 extends from the inner surface 40 to the outer surface 42 in a direction perpendicular to the plane $P_1$. The mounting hole 46a defined by the second mounting section 46 extends from the inner surface 40 to the outer surface 42 in a direction perpendicular to the plane $P_2$. The mounting hole 48a defined by the third mounting section 48 extends from the inner surface 40 to the outer surface 42 in a direction perpendicular to the plane $P_2$.

As shown in FIGS. 1 and 2, the driver's side section 32 of the instrument panel 12 includes a steering wheel W and an instrument display 60. The central section 34 includes an audio system control section 62 and an air conditioning control section 64. The passenger's side section 36 includes a glove box 66 and an airbag panel 68. The airbag panel 68 is supported to the frame portion 30 (a vehicle interior part) concealing the airbag 26. As shown in FIGS. 1 and 2, the airbag panel 68 is positioned adjacent to the passenger's side trim panel 14.

During the assembling process where the various elements of the instrument panel 12 are assembled, elements such as the airbag 26, the instrument display 60, the air conditioning control section 62, the audio system control section 64, the glove box 66 and the airbag panel 68 are all installed prior to installation of the trim panels 14. In other words, in the depicted embodiment, the final installation elements of the instrument panel 12 are the two trim panels 14.

There are two trim panels 14. The trim panels 14 are identical except that they are symmetrical mirror images of one another. Alternatively, the trim panel 14 on the driver's side can differ from the trim panel 14 on the passenger's side, depending on the airbag configuration in the instrument panel 12. For purposes of understanding the invention, description of only one of the trim panels 14 is necessary. As such, the description below applies equally to both trim panels 14. In the description below, only the trim panel 14 located on the passenger's side of the instrument panel 12 is described.

The trim panel 14 is preferably made of a molded plastic material that includes a decorative surface 70 and a hidden backside surface 72. The decorative surface 70 can include a separate, attached textile covering, a leather covering, a wood veneer, and/or the like. Alternatively, the decorative surface 70 can be provided with a textured contour, depending upon the overall design and appearance of the instrument panel 12.

Figure 6:
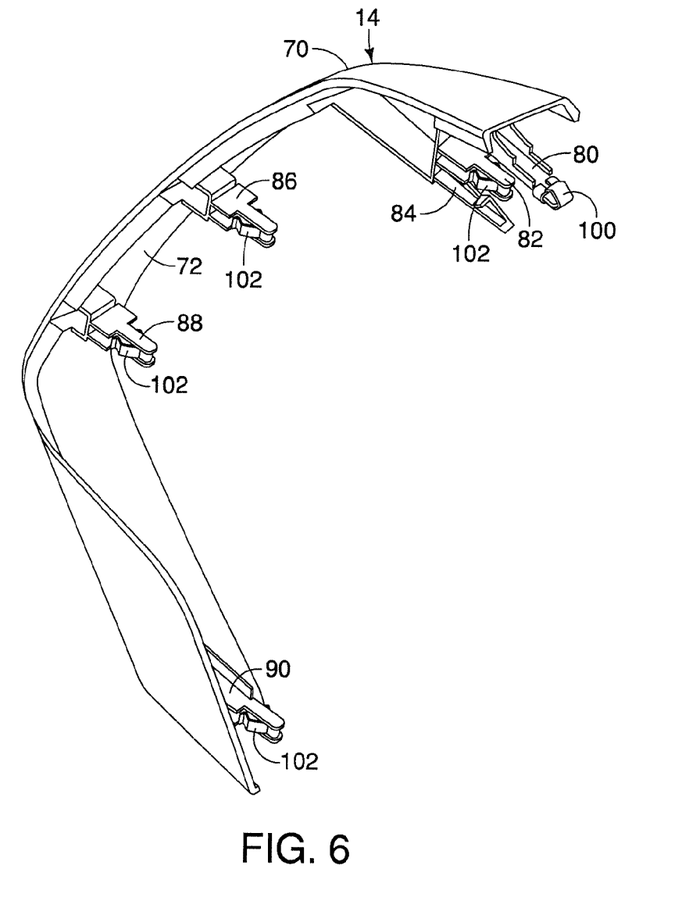
FIG. 6 is a perspective view from above of the trim panel showing a portion of a backside surface of the trim panel along with a plurality of attachment projections in accordance with the one embodiment.
Figure 7:
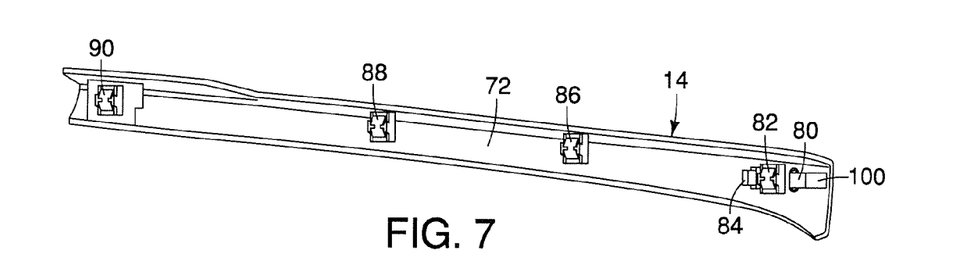
FIG. 7 is a plan view of the backside surface of the trim panel showing the plurality of projections in accordance with the one embodiment.

As shown in FIGS. 6 and 7, the backside surface 72 of the trim panel includes a plurality of projections that extend therefrom. More specifically, the trim panel 14 is formed or molded integrally as a one piece element with the plurality of projections being integrally formed therewith. The plurality of projections include a first projection 80, a second projection 82 and third projection 84 all located at an upper end of the backside surface 72 of the trim panel 14. Below the upper end, the plurality of projections of the trim panel 14 further includes a fourth projection 86, a fifth projection 88 and a sixth projection 90. The trim panel 14 also includes a separately attached first clip 100 and a plurality of separately attached second clips 102 that are described in greater detail below.

Figure 8:
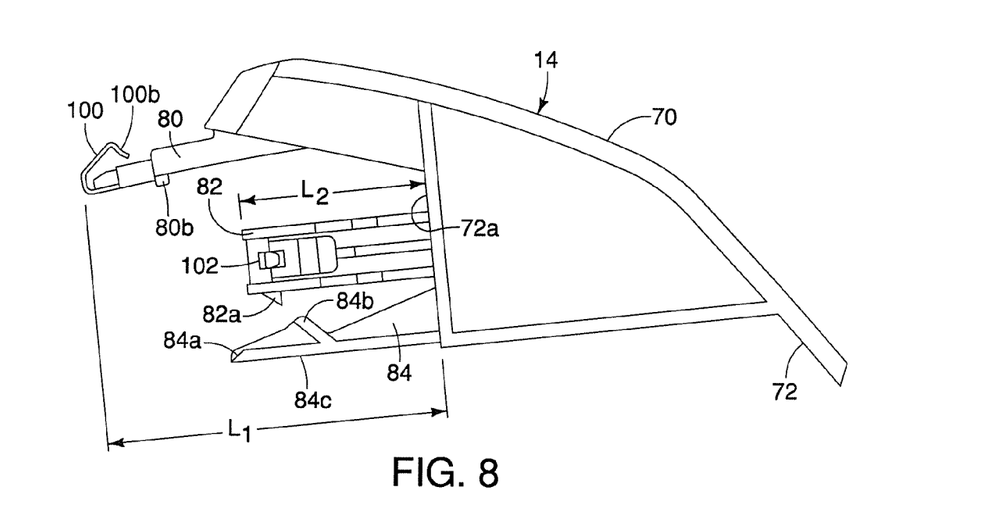
FIG. 8 is a side view of an upper section of the trim panel showing first, second and third projections of the plurality of projections in accordance with the one embodiment.
Figure 9:
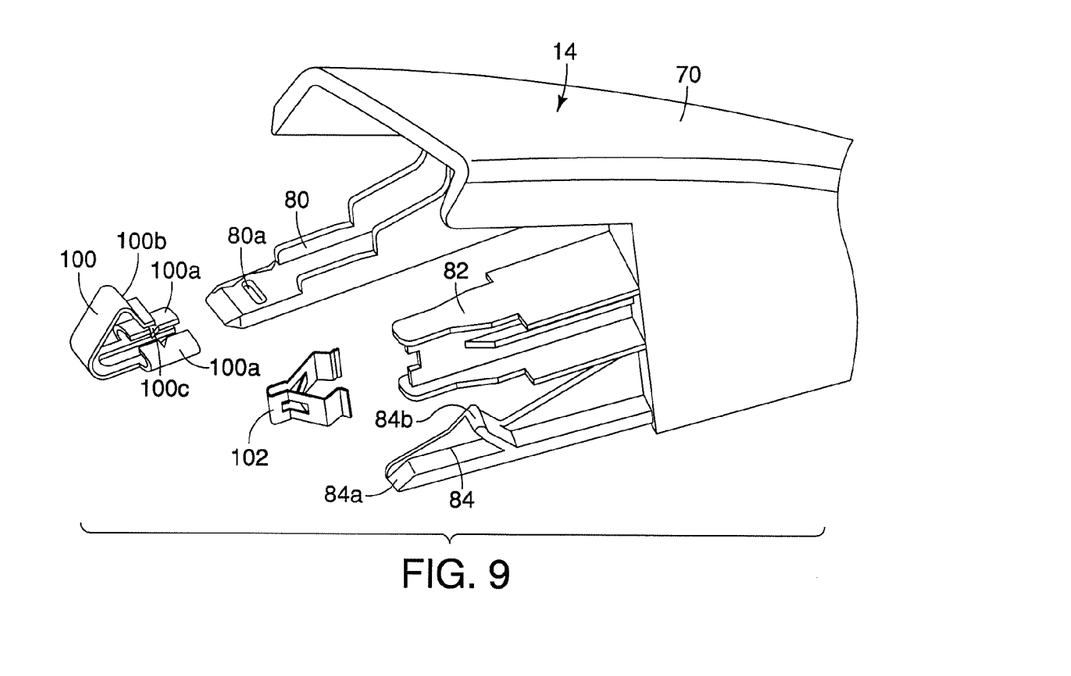
FIG. 9 is an exploded perspective view of the upper section of the trim panel showing several of the projections, a first clip that installs to the first projection and a second clip that installs to the second projection in accordance with the one embodiment.
Figure 10:
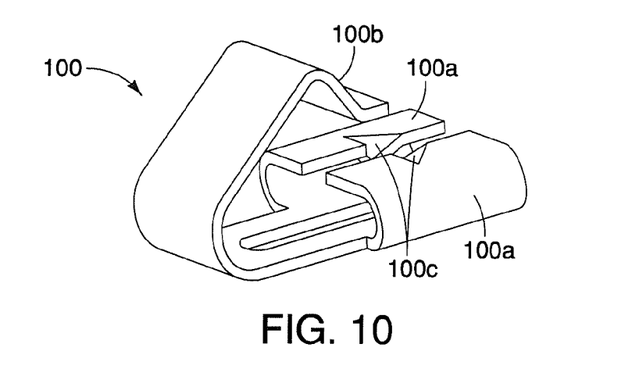
FIG. 10 is perspective view of the first clip shown removed the first projection in accordance with the one embodiment.
Figure 11:
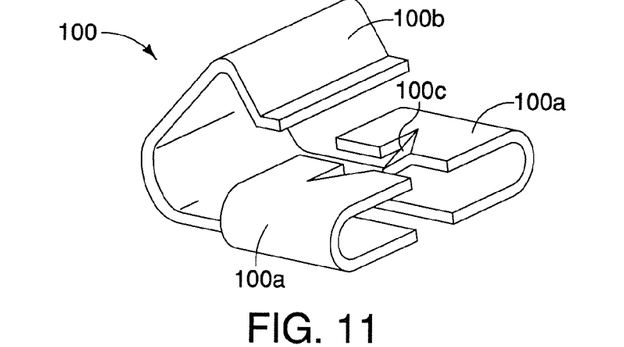
FIG. 11 is another perspective view of the first clip shown removed from the first projection in accordance with the one embodiment.
Figure 12:
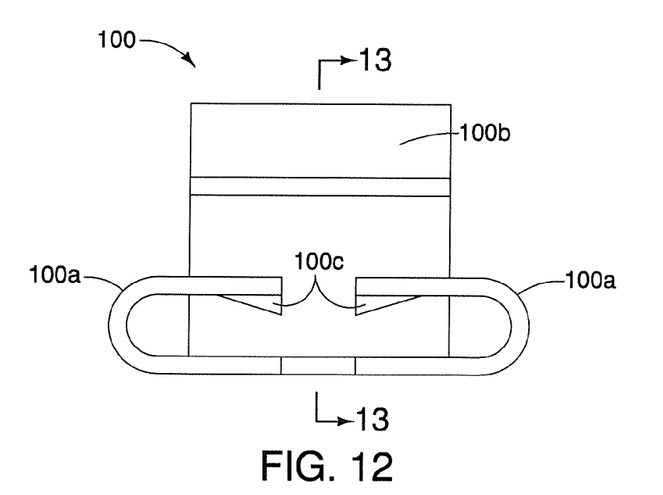
FIG. 12 is an end plan view of the first clip shown removed from the first projection in accordance with the one embodiment.
Figure 13:
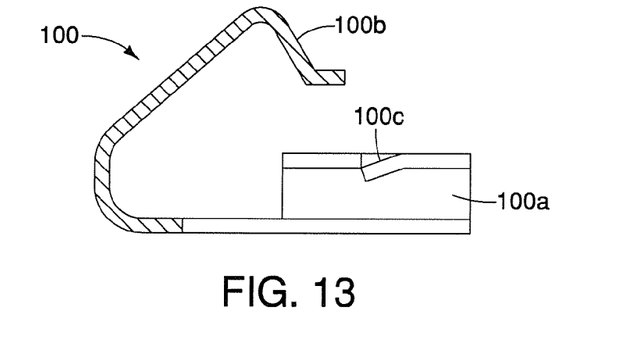
FIG. 13 is a cross-sectional view of the first clip taken along the line 13-13 in FIG. 12 in accordance with the one embodiment.

As shown in FIGS. 8 and 9, the first projection 80 is an elongated cantilevered portion of the trim panel 14. The first projection 80 extends from the backside surface 72. As is indicated in FIG. 8, the first projection 80 does not extend in a direction parallel to either of the second and third projections 82 and 84. Rather, the first projection 80 is slightly inclined or angularly offset from a direction parallel to the second and third projection 82 and 84. As shown in FIG. 9, the first projection 80 includes a dimple or depression 80a on an upper surface thereof.

The first clip 100 is attached to a distal end of the first projection 80, as indicated in FIGS. 8 and 9. As shown in FIGS. 10-13, the first clip 100 includes a pair of clamping portions 100a dimensioned to fit to a distal end of the first projection 80, and a hook end that defines a first restricting portion 100b. Each of the clamping portions 100a is provided with a barb (a deformed area) or tab 100c. The dimple or depression 80a on the upper surface first projection 80 is dimensioned to receive both of the tabs 100c of the first clip 100. When the first clip 100 is installed to the end of the first projection 80, the clamping portions 100a fit around sides of the distal end of the first projection 80 and the tabs 100c snap fit and extend into the depression 80a, locking the first clip 100 to the first projection 80. Attempts to remove the first clip 100 from the first projection 80 cause the tabs 100c to dig into the surface of the first projection 80 in the area around the depression 80a, further fixing the first clip 100 to the first projection 80.

As is shown in FIG. 8, the first projection 80 also includes a downwardly extending stopper block that defines a second restricting portion 80b. The second restricting portion 80b is formed integrally with the first projection 80 and the trim panel 14. The second restricting portion 80b extends in a direction transverse to an insertion direction of the first projection 80, as described in greater detail below. Further, the first restricting portion 100b further extends in a vehicle upward direction and the second restricting portion 80b extends in a vehicle downward direction.

Figure 16:
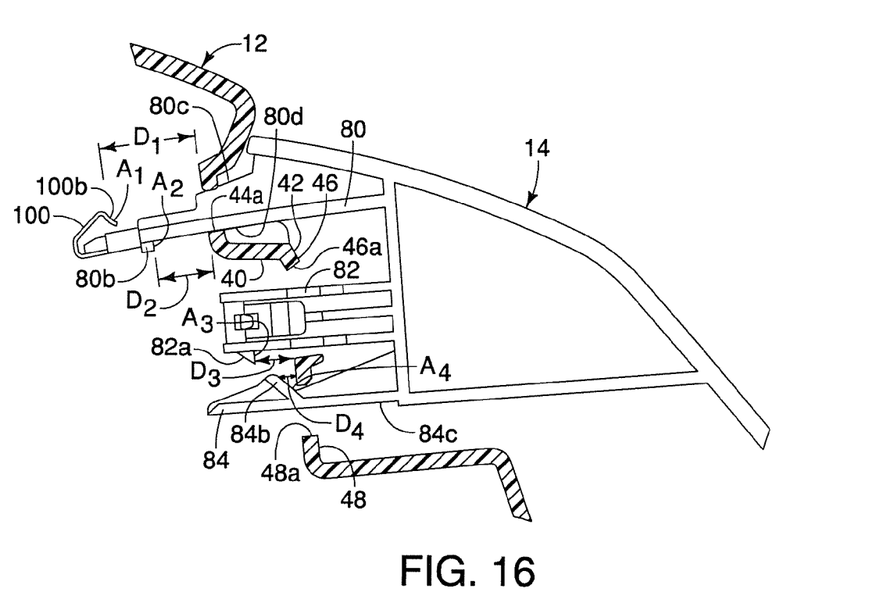
FIG. 16 is a side view of an upper portion of the instrument panel and the trim panel showing first, second and third projections installed to the mounting section of the frame portion, the first projection including the first clip thereby defining a first restricting portion and a downwardly projecting stopper defining a second restricting portion, the second projection including the second clip and a hook defining a third restricting portion and the third projection including a clip portion defining a fourth restricting portion in accordance with the one embodiment.

As shown in FIG. 16, the first projection 80 has an upper surface 80c and a lower surface 80d. The upper and lower surfaces 80c and 80d contact adjacent surfaces of the mounting hole 44a of the frame portion 30 of the instrument panel 12 such that vertical movement of the trim panel 14 relative to the frame portion 30 of the instrument panel 12 is restricted with the trim panel 14 in the installed position (shown in FIGS. 4 and 16).

The insertion direction of the first projection 80 is defined as the direction of movement of the first projection 80 during installation into the mounting hole 44a of the first mounting section 44 of the frame portion 30 of the instrument panel 30. The insertion direction is indicated by the arrows A in FIG. 3. The arrows A indicate the movement of each of the projections 80, 82, 84, 86, 88 and 90 as they move from an uninstalled position adjacent to the instrument panel 12 (FIG. 3) to an installed position (FIG. 4).

As shown in FIG. 8, the second projection 82 includes a hook that defines a third restricting portion 82a. The third restricting portion 82a extends in a vehicle downward direction from the second projection 82. As shown in FIGS. 3 and 4, the second projection 82, the fourth projection 86, the fifth projection 88 and the sixth projection 90 all extend in directions parallel to one another. Hence, the first projection 80 is angularly offset relative to each of the second projection 82, the fourth projection 86, the fifth projection 88 and the sixth projection 90. In other words, the first projection 80 is not parallel to any of the second projection 82, the fourth projection 86, the fifth projection 88 and the sixth projection 90.

As is also shown in FIG. 8, the first projection 80 has a first length $L_1$ measured from a support surface 72a of the trim panel 14 to a distal end of the first projection 80. The second projection 82 has a second length $L_2$ measured from the support surface 72a of the trim panel 14 to a distal end of the second projection 82. The first length $L_1$ is greater than the second length $L_2$.

Figure 14:
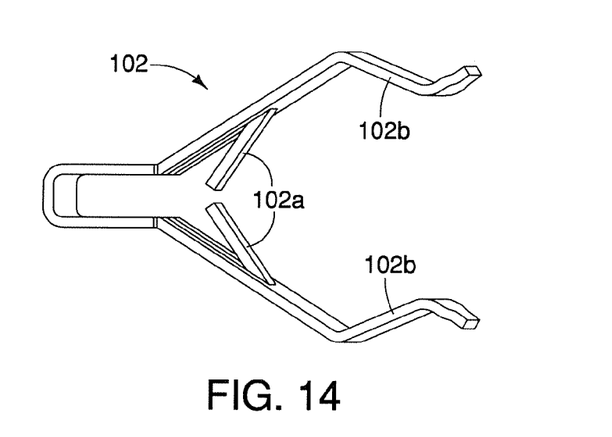
FIG. 14 is a top view of the second clip shown removed from the second projection in accordance with the one embodiment.
Figure 15:
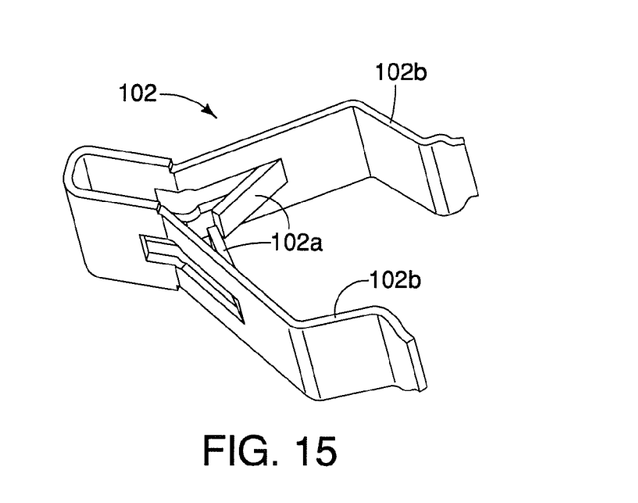
FIG. 15 is a perspective view of the second clip shown removed from the second projection in accordance with the one embodiment.

The second projection 82 is also provided with one of the plurality of second clips 102. As shown in FIGS. 14 and 15, the second clips 102 each include inner attachment tabs 102a and outwardly extending attachment projections 102b. Similarly, each of the fourth projection 86, the fifth projection 88 and the sixth projection 90 are also provided with one of the plurality of second clips 102. The second clips 102 mount to respective distal ends of the second projection 82, the fourth projection 86, the fifth projection 88 and the sixth projection 90, as shown in FIGS. 3, 4, 6 and 7. The inner attachment tabs 102a of the second clips 102 are arranged to clamp on to respective distal ends of the second projection 82, the fourth projection 86, the fifth projection 88 and the sixth projection 90 in a conventional manner.

FIG. 4 shows the trim panel 14 installed to the frame portion 30 of the instrument panel 12. As shown in FIG. 4, the second projection 82, the fourth projection 86, the fifth projection 88 and the sixth projection 90, retain the trim panel 14 in an installed position against the frame portion 30 of the instrument panel 12. More specifically, in the installed position, the outwardly extending attachment projections 102b of respective ones of the plurality of second clips 102 contact and engage surfaces of the frame portion 30 that define the mounting holes 46a, 50a, 52a and 54a, thereby retaining the trim panel 14 in the installed position. The outwardly extending attachment projections 102b are compressed between lateral surfaces of the corresponding mounting hole when installed to the mounting holes 46a, 50a, 52a and 54a. For example, when the second projection 82 is installed to the mounting hole 46a of the second mounting section 46, the attachment projections 102b of the second clip 102 contact and press against lateral sides 46b of the mounting hole 46a (see FIG. 5). The outwardly extending attachment projections 102b provide an outward biasing force when installed. Therefore, once installed, the outwardly extending attachment projections 102b retain the plurality of second clips 102 (and respective ones of the second projection 82, the fourth projection 86, the fifth projection 88 and the sixth projection 90) within the mounting holes 46a, 50a, 52a and 54a. In other words, the second clips 102 retain the trim panel 14 in the installed position relative to the instrument panel 12. Since the second clips 102 are conventional elements and their usage in installing trim components within vehicles is well known, further description is omitted for the sake of brevity.

As is explained in greater detail below, the first projection 80 and the third projection 82 are not required to hold or retain the trim panel 14 in the installed position against the frame portion 30 of the instrument panel 12. Rather, the first projection 80 and the third projection 82 retain the trim panel 14 from being completely detached from the instrument panel 12 when the airbag 26 deploys, as explained below after a description of the third projection 84.

The third projection 84 extends from the backside surface 72. A bottom surface 84c of the third projection 84 extends in a direction that is approximately parallel to the second projection 82. The third projection 84 includes a distal end 84a and an upwardly extending protrusion that defines a fourth restricting portion 84b. The fourth restricting portion 84b is located proximate a mid-section of the third projection 84, spaced apart from the distal end 84a of the third projection 84. The third projection 84 is angularly offset from both a vertical direction and a horizontal direction with the trim panel 84 in the installed position.

As shown in FIG. 16, each of the first, second and third projections 80, 82 and 84 extends generally in an insertion direction from the backside surface 70 of the trim panel 14 through the respective mounting holes 44a, 46a and 48a of the first, second and third mounting sections 44, 46 and 48 of the frame portion 30, except that the first projection 80 is angularly offset from a direction parallel to the second and third projections 82 and 84. In the installed position (FIG. 4): the first projection 80 extends into the mounting hole 44a of the first mounting section 44; the second projection 82 extends into the mounting hole 46a of the second mounting section 46; and, the third projection 84 extends into the mounting hole 48a of the third mounting section 48. Each of the first, second and third projections 80, 82 and 84 includes at least one restricting portion that retains the trim panel 14 from being completely detached from the instrument panel 12 upon deployment of the airbag 26.

As shown in FIG. 16, the restricting portions of the first, second and third projections 80, 82 and 84 are spaced apart from an adjacent section of the inner surface 40 of the frame portion 30 of the instrument panel 12 by differing respective distances. Specifically, the first restricting portion 100b of the first projection 80 defines an abutment surface $A_1$ facing the first mounting section 44. The abutment surface $A_1$ of the first restricting portion 100b is spaced apart from the inner surface 40 at the first mounting section 44 by a first distance $D_1$. The second restricting portion 80b of the first projection 80 defines an abutment surface $A_2$ facing the first mounting section 44. The abutment surface $A_2$ of the second restricting portion 80b is spaced apart from the inner surface 40 at the first mounting section 44 by a second distance $D_2$. The third restricting portion 82a of the second projection 82 defines an abutment surface $A_3$ facing the second mounting section 46. The abutment surface $A_3$ of the third restricting portion 82a is spaced apart from the inner surface 40 at the second mounting section 46 by a third distance $D_3$. Finally, the fourth restricting portion 84b of the third projection 84 defines an abutment surface $A_4$ facing the inner surface 40. The abutment surface $A_4$ of the fourth restricting portion 84b is spaced apart from the inner surface 40 at the third mounting section 46 by a fourth distance $D_4$.

As shown in FIG. 16, the first distance $D_1$ is greater than the second distance $D_2$, the second distance $D_2$ is greater than the third distance $D_3$, and the third distance is greater than the fourth distance $D_4$. In other words, the first restricting portion 100b, the second restricting portion 80b, the third restricting portion 82a, the fourth restricting portion 84b are located at differing positions relative to contact portions of the inner surface 40 where the first restricting portion 100b, the second restricting portion 80b, the third restricting portion 82a, the fourth restricting portion 84b could possibly contact the inner surface 40 when the trim panel 14 becomes detached.

Each of FIGS. 17, 18, 19 and 20 shows the trim panel 14 in a different restrained position in response to the trim panel 14 moving after deployment of the airbag 26. Each restrained position represents a differing one of the first restricting portion 100b, the second restricting portion 80b, the third restricting portion 82a, the fourth restricting portion 84b restricting further movement of the trim panel 14 after detachment.

More specifically, in a circumstance where the airbag 26 deploys, the airbag panel 68 (shown FIGS. 1 and 2) will at least partially detach from the instrument panel 12, allowing the airbag 26 to inflate and expand to protect the vehicle passenger. It is also possible for the trim panel 14 to additionally be dislodged from the installed position as a result of deployment of the airbag 26. If the trim panel 14 does become dislodged from the installed position relative to the instrument panel 12, one or more of the first, second, third and fourth restricting portions 100b, 80b, 82a and 84b retains or restrains the trim panel 14 from being completely detached from the instrument panel 12.

Figure 17:
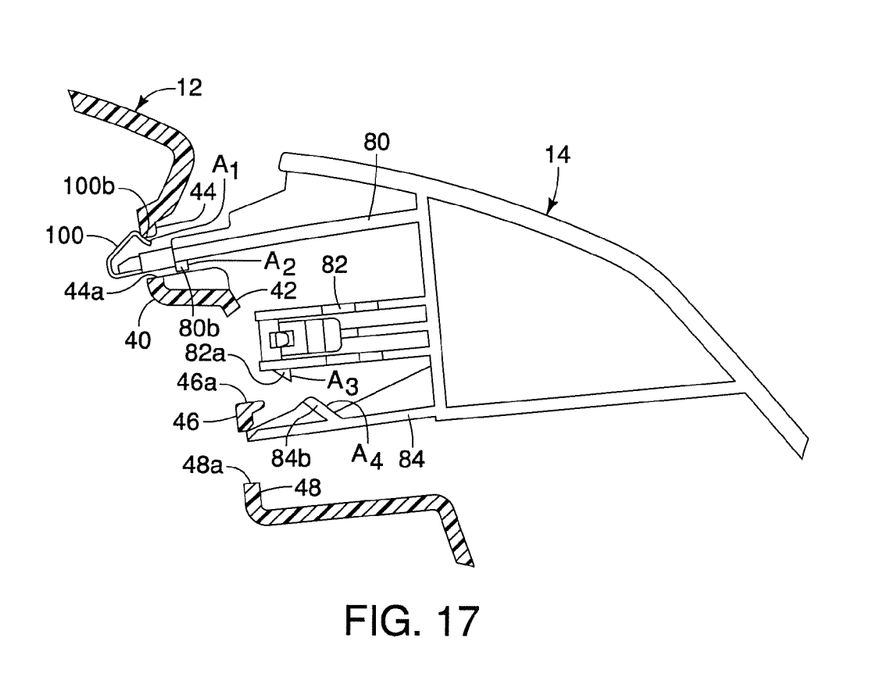
FIG. 17 is another side view of the upper portion of the instrument panel and the trim panel showing the first restricting portion preventing the trim panel from becoming disconnected from the instrument panel in accordance with the one embodiment.

For example, as shown in FIG. 17, in the event that the trim panel 14 becomes dislodged by an airbag deployment event where the trim panel 14 is moved upward and/or rearward relative to the instrument panel 12, the trim panel 14 can move the first distance $D_1$ until the first restricting portion 100b contacts an upper region of the first mounting section 44, along the inner surface 40 of the frame portion 30. It should be noted that the first restricting portion 100b is at least a portion of a deflectable part of the first clip 100 that is cantilevered with respect to the first projection 80. Further, the first restricting portion 100b (the deflectable part) basically forms an abutment that contacts the inner surface 40 upon the trim panel 14 being moved by the first distance $D_1$ (a first prescribed deployment distance) from the installed position to the restrained position depicted in FIG. 17.

Figure 18:
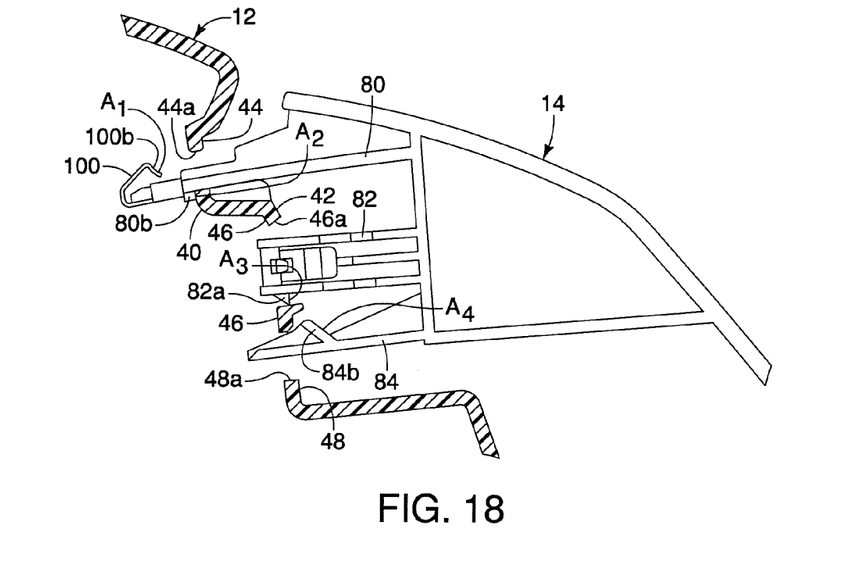
FIG. 18 is another side view of the upper portion of the instrument panel and the trim panel showing the second restricting portion preventing the trim panel from becoming disconnected from the instrument panel in accordance with the one embodiment.

As shown in FIG. 18, in the event that the trim panel 14 becomes dislodged by an airbag deployment event where the trim panel 14 is moved rearward and/or downward relative to the instrument panel 14, the trim panel 14 can move the second distance $D_2$ until the second restricting portion 80b contacts a lower region of the first mounting section 44, along the inner surface 40 of the frame portion 30.

Figure 19:
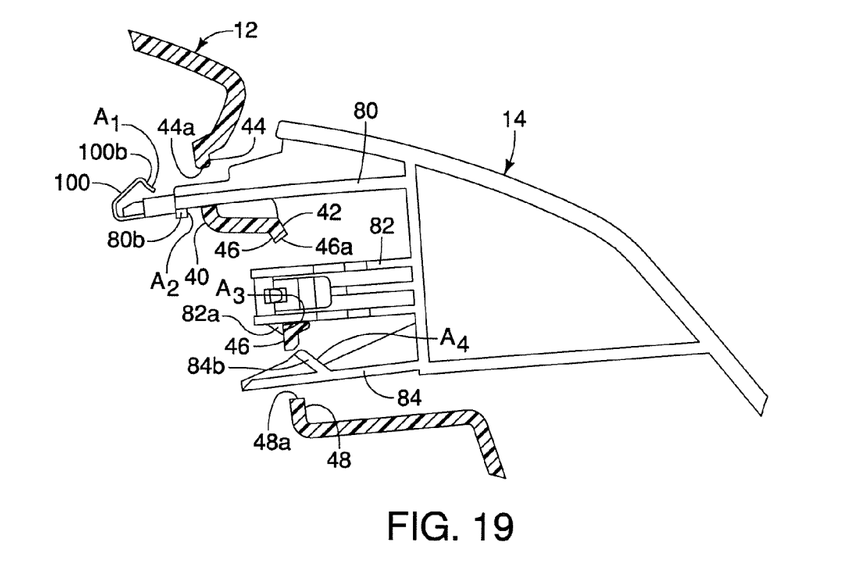
FIG. 19 is another side view of the upper portion of the instrument panel and the trim panel showing the third restricting portion preventing the trim panel from becoming disconnected from the instrument panel in accordance with the one embodiment.

As shown in FIG. 19, in the event that the trim panel 14 becomes dislodged by an airbag deployment event where the trim panel 14 is moved downward and/or rearward relative to the instrument panel 14, the trim panel 14 can move the third distance $D_3$ until the third restricting portion 82a contacts a lower region of the second mounting section 46, along the inner surface 40 of the frame portion 30. It should further be noted that the second clip 102 is an attachment portion that attaches the trim panel 14 to the instrument panel 12. Hence, the third restricting portion 82a and the second clip 102 (an attachment portion) are disposed on a common one of the plurality of projections.

Figure 20:
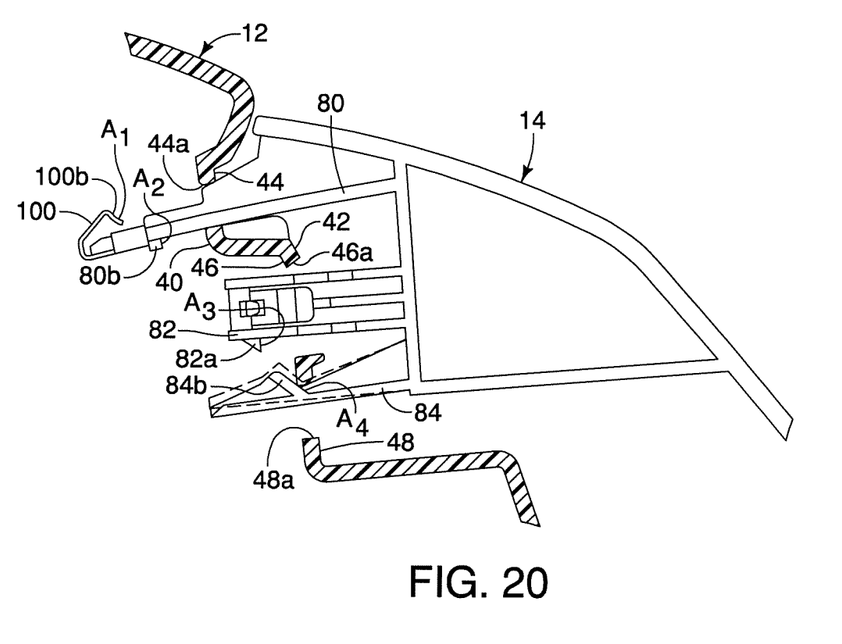
FIG. 20 is another side view of the upper portion of the instrument panel and the trim panel showing the fourth restricting portion preventing the trim panel from becoming disconnected from the instrument panel in accordance with the one embodiment.

Finally, as shown in FIG. 20, in the event that the trim panel 14 becomes dislodged by an airbag deployment event where the trim panel 14 is moved upward and/or rearward relative to the instrument panel 14, the trim panel 14 can move the fourth distance $D_4$ until the fourth restricting portion 84b contacts an upper region of the third mounting section 46, along the inner surface 40 of the frame portion 30. It should be noted that the third projection 84 is a deflectable part that deflects in a direction transverse to the insertion direction (arrow A) of the first, second and third projections 80, 82 and 84 during installation to the frame portion 30.

Thus, the trim panel 14 is provided with four differing types restricting portions, each able to retain the trim panel 14 from being completely detached from the instrument panel 12 during or after airbag deployment. Further, the four differing types of restricting portions provide multiple levels of retention such that if the trim panel 14 becomes dislodged from the installed position depicted in FIG. 4, regardless of the direction of the dislodging momentum, one or more of the first restricting portion 100b, the second restricting portion 80b, the third restricting portion 82a and the fourth restricting portion 84b contacts the inner surface 40 of the frame portion 30 and prevents the trim panel 14 from becoming completely detached from the instrument panel 12.

The trim panel 14 is easily installed and removed from the instrument panel 12, in spite of the inclusion of the first restricting portion 100*b*, the second restricting portion 80*b*, the third restricting portion 82*a* and the fourth restricting portion 84*b*.

To install the trim panel 14, the first projection 80 is first installed until the first restricting portion 100*b* snap fits into the mounting hole 44*a*, as shown in FIG. 17. Using the first restricting portion 100*b* as a pivot point for leverage, the installer then pivots the trim panel 14 about the contact point between the first restricting portion 100*b* and adjacent section of the inner surface 40. By pushing the trim panel 14 gently upward, the second projection 82 and the third restricting portion 82*a* can move through the mounting hole 46*a*. Continued movement in the installation direction can continue until the third projection 84 deflects in response to contact with the upper surface of the mounting hole 48*a* of the third mounting section 48. At a point of substantial deflection of the third projection 84, the fourth restricting portion 84*b* can be inserted into the mounting hole 48*a*. The trim panel 14 is then pushed into place causing the plurality of second clips 102 to snap fit into respective mounting holes 46*a*, 50*a*, 52*a* and 54*a*.

To remove the trim panel 14, the above process is reversed, by initially pulling the second clips 102 out of their snap fit positions, angling the trim panel 14 upward such that a bottom end thereof is moved away from the instrument panel 12. The third projection 84 is then intentionally deflected in order to allow the fourth restricting portion 84*b* to move out of the mounting hole 48*a*. Once the fourth restricting portion 84*b* has cleared the mounting hole 48*a*, the trim panel 14 is moved upward slightly to allow the third restricting portion 82*a* to be moved out of the mounting hole 46*a*. Thereafter, simple upward, outward and then downward movement of the trim panel allows the second restricting portion 80*b* and the first restricting portion 100*b* to come out of the mounting hole 44*a*.

The above described series of upward and downward movements necessary to install and remove the trim panel 14 from the instrument panel 12 demonstrate the complex series of movements necessary to free the trim panel 14. Thus, during a typically instantaneous airbag deployment event, if the trim panel 14 becomes dislodged, one or more of the first restricting portion 100*b*, the second restricting portion 80*b*, the third restricting portion 82*a* and the fourth restricting portion 84*b* will restrain the trim panel 14 against complete removal from the instrument panel 14 without the need of a separate tether or tethering device.

The various sections of the passenger compartment 10 and the instrument panel 12 other than the trim panel 14 are conventional components that are well known in the art. Since these features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle interior assembly. Accordingly, these terms, as utilized to describe the present invention should be interpreted relative to a vehicle equipped with the vehicle interior assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle interior assembly comprising:
   a vehicle interior part including at least two mounting sections defining at least two mounting openings extending therethrough; and
   a trim panel including at least two projections extending through the at least two mounting openings of the vehicle interior part from a backside surface of the trim panel, respectively, one of the projections having an attachment portion that retains the trim panel on the vehicle interior part in an installed position, and
   one of the projections including a restricting portion spaced apart in a non-contacting manner from the at least two mounting section of the vehicle interior part by a first prescribed deployment distance with the trim panel in the installed position, the restricting portion being configured to contact a corresponding one of the at least two mounting sections of the vehicle interior part and retain the trim panel from being completely detached from the vehicle interior part.

2. The vehicle interior assembly according to claim 1, wherein
   the restricting portion extends in a direction transverse to an insertion direction of the first and second projections.

3. The vehicle interior assembly according to claim 2, wherein
   the restricting portion further extends in a vehicle downward direction.

4. The vehicle interior assembly according to claim 2, wherein
   the restricting portion further extends in a vehicle upward direction.

5. The vehicle interior assembly according to claim 1, wherein
the restricting portion includes a deflectable part that deflects in a direction transverse to an insertion direction of the first and second projections during installation of the one of the projections including the restricting portion.

6. The vehicle interior assembly according to claim 1, wherein
the restricting portion includes a deflectable part that is cantilevered with respect to the one of the projections including the restricting portion, and the deflectable part includes an abutment that contacts the vehicle interior part upon the trim panel being moved by the first prescribed deployment distance from the installed position to a restrained position.

7. The vehicle interior assembly according to claim 1, wherein
the attachment portion and the restricting portion are disposed on a common one of the at least two projections.

8. The vehicle interior assembly according to claim 1, wherein
the restricting portion constitutes a first restricting portion that is disposed on a first projection of the at least two projections, and the attachment portion is disposed on a second projection of the at least two projections.

9. The vehicle interior assembly according to claim 8, wherein
the second projection includes a second restricting portion that is spaced from a corresponding one of the at least two mounting sections of the vehicle interior part by a second prescribed deployment distance.

10. The vehicle interior assembly according to claim 9, wherein
the at least two mounting sections of the vehicle interior part includes first, second and third mounting sections defining first, second and third mounting openings respectively, as the at least two mounting openings, and
the trim panel includes a third projection extending through the third mounting opening of the vehicle interior part from a backside surface of the trim panel, the third projection including a third restricting portion spaced from a corresponding one of the first, second and third mounting sections of the vehicle interior part by a third prescribed deployment distance.

11. The vehicle interior assembly according to claim 10, wherein
at least two of the first, second and third mounting sections lie in planes that are offset from each other.

12. The vehicle interior assembly according to claim 10, wherein
the first, second and third prescribed deployment distances are each different distances.

13. The vehicle interior assembly according to claim 12, wherein
the first prescribed deployment distance is measured from the vehicle interior part at the first mounting section to an abutment surface of the first restricting portion,
the second prescribed deployment distance is measured from the vehicle interior part at the second mounting section to an abutment surface of the second restricting portion, and
the third prescribed deployment distance is measured from the vehicle interior part at the third mounting section to an abutment surface of the third restricting portion.

14. The vehicle interior assembly according to claim 10, wherein
the first projection includes a fourth restricting portion that is spaced from a corresponding one of the first, section and third mounting sections of the vehicle interior part by a fourth prescribed deployment distance with the trim panel in the installed position, the first restricting portion extending in a vehicle upward direction and the fourth restricting portion extending in a vehicle downward direction.

15. The vehicle interior assembly according to claim 10, wherein
the first projection includes a fourth restricting portion that is spaced from a corresponding one of the first, second and third mounting sections of the vehicle interior part by a fourth prescribed deployment distance with the trim panel in the installed position, the second restricting portion and the fourth restricting portion extending in a vehicle downward direction.

16. The vehicle interior assembly according to claim 10, wherein
the first restricting portion and the third restricting portion extend in a vehicle downward direction.

17. The vehicle interior assembly according to claim 10, wherein
the first restricting portion of the first projection includes a restricting clip fitted to a distal end of the first projection, the restricting clip having an abutment surface with the first prescribed deployment distance being measured from the vehicle interior part at the first mounting section to the abutment surface of the first restricting portion.

18. The vehicle interior assembly according to claim 8, wherein
the first projection includes upper and lower surfaces that contact adjacent surfaces of the vehicle interior part that define the first opening such that vertical movement of the trim panel relative to the vehicle interior part is restricted with the trim panel in the installed position.

19. The vehicle interior assembly according to claim 8, wherein
the first projection has a first length measured from the support surface of the trim panel to a distal end of the first projection, and
the second projection has a second length measured from the support surface of the trim panel to a distal end of the second projection, the first length being greater than the second length.

20. The vehicle interior assembly according to claim 1, further comprising
an airbag supported in a fixed position relative to the vehicle interior part; and
an airbag panel supported to the vehicle interior part concealing the airbag, the airbag panel being positioned adjacent to the trim panel.

* * * * *